United States Patent
Ohnishi (10) Patent No.: US 9,457,556 B2
(45) Date of Patent: Oct. 4, 2016

(54) MANUFACTURING METHOD OF SHAPED OBJECT

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 177 days.

(21) Appl. No.: 14/572,794

(22) Filed: Dec. 17, 2014

(65) Prior Publication Data

US 2015/0183160 A1    Jul. 2, 2015

(30) Foreign Application Priority Data

Dec. 26, 2013  (JP) ................. 2013-270511

(51) Int. Cl.
| | |
|---|---|
| *B29C 33/52* | (2006.01) |
| *B29C 41/02* | (2006.01) |
| *B29C 41/38* | (2006.01) |
| *B33Y 10/00* | (2015.01) |
| *B29C 67/00* | (2006.01) |
| *B29L 9/00* | (2006.01) |

(52) U.S. Cl.
CPC ............ *B33Y 10/00* (2014.12); *B29C 67/0059* (2013.01); *B29C 67/0092* (2013.01); *B29L 2009/00* (2013.01)

(58) Field of Classification Search
CPC ....... B29C 33/52; B29C 41/02; B29C 41/38; B29C 67/0059; B29C 67/0092
USPC .................................................. 264/308, 317
See application file for complete search history.

(56) References Cited

U.S. PATENT DOCUMENTS

2013/0329006 A1* 12/2013 Boles ................ G06F 17/30879
348/42

FOREIGN PATENT DOCUMENTS

JP        2003-071530          3/2003

* cited by examiner

*Primary Examiner* — Leo B Tentoni
(74) *Attorney, Agent, or Firm* — Jianq Chyun IP Office (57) ABSTRACT

A manufacturing method of a shaped object is provided, in which a surface of the shaped object can be decorated, while the shaped object being in a forming process. In the manufacturing method of a shaped object, according to the present invention; by way of laminating ink discharged from different ink-jet nozzles, forming operation and decorating operation on a surface of a formed structure can also be put into practice at the same time.

14 Claims, 11 Drawing Sheets

FIG. 9 area 'D'
FIG. 10

FIG. 11

MANUFACTURING METHOD OF SHAPED OBJECT

CROSS-REFERENCE TO RELATED APPLICATION

This application claims the priority benefit of Japan application serial no. 2013-270511, filed on Dec. 26, 2013. The entirety of the above-mentioned patent application is hereby incorporated by reference herein and made a part of specification.

FIELD OF THE INVENTION

The present invention relates to a manufacturing method of a shaped object; and for more detail, the present invention relates to a manufacturing method in which a surface of a shaped object is decorated, while the shaped object being in a forming process.

BACKGROUND

A fused deposition molding (FDM) method, an ink-jet method, an ink-jet binder method, an optical stereo lithography (SL) method, and a selective laser sintering (SLS) method in addition to a sheet lamination method as disclosed in Patent Document 1, are known as methods for forming a tridimensional cubic body.

Among those methods, popularly used is a method as one of ink-jet methods, in which a mask pattern is laminated by way of jetting an ultraviolet curable resin material by using a 3D printer. According to this method, a datum of an internal and external appearance design, a structure, and the like of an end product is created by a tridimensional CAD; and subsequently, by means of slicing the datum by a computer, a mask pattern datum of a multi-layer type in order for laminating thin plates is created; and an ultraviolet curable resin material is jetted out of a head for lamination, according to the mask pattern datum in order to manufacture a cubic object.

Moreover, decoration on a surface of a shaped object formed by using such a method is also known. "Decoration on a surface" in this context means altering a texture of the surface, or adding a color.

PRIOR ART DOCUMENT

Patent Document

[Patent Document 1] Japanese Unexamined Patent Application Publication No. 2003-71530 (laid open on Mach 11, 2003)

SUMMARY OF INVENTION

Problem to Be Solved

Unfortunately, most of technologies for providing a surface of a shaped object with a pattern and a color are materialized by means of decoration on the surface after forming the shaped object, and there exist few methods in which the surface of the shaped object being in a forming process is decorated during the forming process, while the shaped object being in the forming process.

Moreover, in the case of a method of decoration on a surface of a shaped object that has been finished, sometimes surface decoration cannot ideally be materialized on the surface if the shaped object has a complicated cubic structure.

In other words, for offering a solution to the above issue, it is an objective of the present invention to provide a new manufacturing method of a shaped object, in which a surface of the shaped object can be decorated, while the shaped object being in a forming process.

Means to Solve the Problem

To bring a solution for the subject described above, a manufacturing method of a shaped object, according to the present invention, comprises: a lower area forming process in which first ink and second ink are discharged for forming a lower area where a layer of the second ink is laminated on a layer of the first ink; a middle area forming process in which, after the lower area forming process described above, the first ink, the second ink, and third ink are discharged, regardless of order of discharging operations, for forming a middle area, where a layer of the second ink is positioned around a layer of the third ink and a layer of the first ink is positioned around the layer of the second ink in relation to a horizontal direction; and an upper area forming process in which, after the middle area forming process described above, the second ink and the first ink are discharged for forming an upper area where a layer of the first ink is laminated on a layer of the second ink; wherein, for the purpose of forming a shaped object, a main body having a cubic structure is constructed with the third ink, a light-blocking layer covering a surface of the main body is constructed with the second ink, and moreover a decorating layer covering a surface of the light-blocking layer is constructed with the first ink.

According to the configuration described above, it is possible to provide a manufacturing method of a shaped object, in which a surface of the shaped object can be decorated, while the shaped object being in a forming process.

Furthermore, according to the configuration described above, shaping operation (forming the main body) and decorating operation (forming the light-blocking layer and the decorating layer) are put into practice in parallel; and therefore even in the case where a shaped object has a complicated cubic structure, surface decoration can ideally be materialized on a surface of a main body.

Moreover, according to the configuration described above, the light-blocking layer is provided between the main body and the decorating layer; and therefore even in the case where the main body is made of a material being transmissive, such as a transparent material, light does not inconveniently enter, for example, from a backside of the decorating layer.

In a mode of the manufacturing method of a shaped object according to the present invention; in addition to the above configuration, the first ink and the second ink are discharged by means of an ink-jet method; and in the lower area forming process, a first ink-jet nozzle for discharging the first ink and a second ink-jet nozzle for discharging the second ink are collectively moved in such a way that the second ink-jet nozzle passes through above a certain area, subsequent to the first ink-jet nozzle, and each of the first and second ink-jet nozzles discharges ink onto the certain area; and meanwhile in the upper area forming process, the first ink-jet nozzle passes through above another certain area, subsequent to the second ink-jet nozzle, and each of the first and second ink-jet nozzles discharges ink onto the relevant certain area.

According to the configuration described above, a laminated structure can be formed by way of discharging ink from each nozzle.

Moreover, in a mode of the manufacturing method of a shaped object according to the present invention; in addition to the configuration described above, the third ink is also discharged in the lower area forming process in such a way that a layer of the third ink is laminated on the layer of the second ink.

According to the configuration described above, the decorating layer, the light-blocking layer, and the main body can be formed at once in the lower area forming process.

Moreover, in a mode of the manufacturing method of a shaped object according to the present invention; in addition to the configuration described above, the third ink is also discharged in the upper area forming process so that the layer of the second ink is laminated on a layer of the third ink.

According to the configuration described above, the decorating layer, the light-blocking layer, and the main body can be formed at once in the upper area forming process.

In a mode of the manufacturing method of a shaped object according to the present invention; in addition to the above configuration, the middle area forming process forms an area of the shaped object, in which a normal line angle at an outer surface of the layer of the first ink in the shaped object is included in an angular range of ±45 degrees, in relation to a horizontal line or a reference line along which the first ink-jet nozzle discharging the first ink moves.

In a mode of the manufacturing method of a shaped object according to the present invention; in addition to the above configuration, the shaped object is spherical, and the middle area forming process forms an area of the shaped object, which is, being centered around a center point of the spherical object, included in an angular range within 45 degrees upward and downward, with respect to the horizontal plane passing through the center point.

In a mode of the manufacturing method of a shaped object according to the present invention; in addition to the above configuration, colored ink or decoration ink is used as the first ink.

In a mode of the manufacturing method of a shaped object according to the present invention; in addition to the above configuration, white ink, silver ink, or metallic ink is used as the second ink.

In a mode of the manufacturing method of a shaped object according to the present invention; in addition to the above configuration, supporting-component ink for forming a supporting component as a support for the shaped object is discharged in at least one process out of the lower area forming process, the middle area forming process, and the upper area forming process.

Advantageous Effect of the Invention

According to the present invention, by using an ink-jet method, a surface of a shaped object can be decorated, while the shaped object being in a forming process.

DESCRIPTION OF THE PREFERRED EMBODIMENT

An embodiment of a manufacturing method of a shaped object according to the present invention is explained below. At first, a structure of a shaped object to be formed by way of a manufacturing method for a shaped object according to the present embodiment is explained with reference to FIG. 1, and then the manufacturing method for a shaped object according to the present embodiment is explained next.

Figure 1:
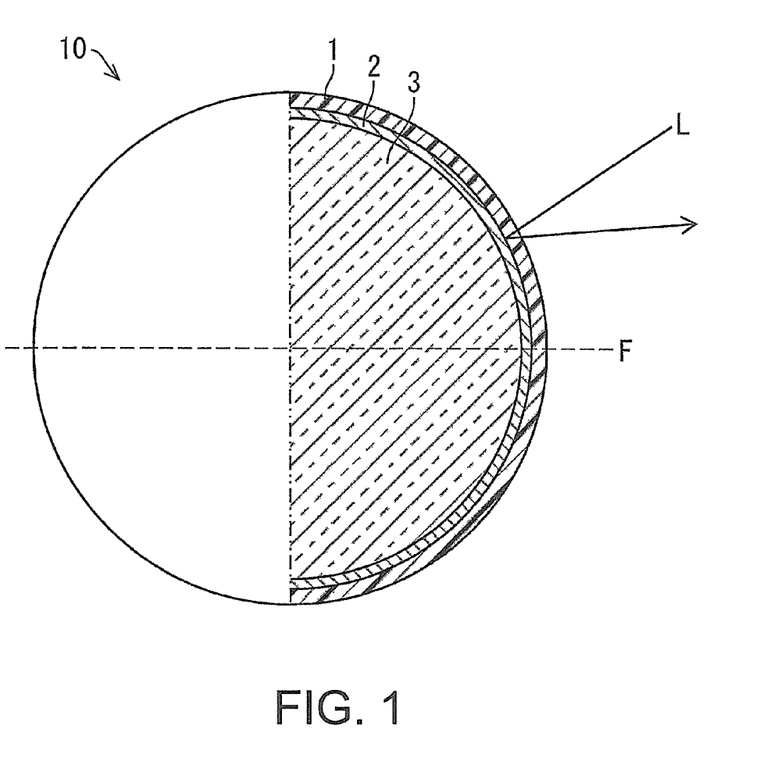
FIG. 1 is a partial cross section view of a shaped object formed by means of a manufacturing method of a shaped object according to an embodiment of the present invention.

FIG. 1 is a partial cross section view of a shaped object formed by means of a manufacturing method of a shaped object according to a present embodiment. A shaped object 10 has a spherical form for its external. The shaped object 10 includes a main body 3, a light-blocking layer 2 covering a surface of the main body 3, and a decorating layer 1 covering a surface of the light-blocking layer 2.

As described later, the main body 3 is formed by way of discharging ink of a shaping material by using an ink-jet method, and hardening the deposition by irradiating it with ultraviolet. The main body 3 is an essential unit of the shaped object 10, and it can be seen as a part that determines a cubic structure of the shaped object 10. Namely, in the present embodiment, the main body 3 as an essential unit has a spherical form, and therefore the shaped object 10 has a spherical form. In other words, the decorating layer 1 and the light-blocking layer 2 are nothing more than coating the surface of the spherical main body 3 as an essential unit.

In the present embodiment, the main body 3 is a transparent body. In the case where the main body 3 is structured with a transparent body; if a certain part of the surface of the main body 3 is decorated (by way of coloring or drawing a letter), sometimes a backside surface of the decorated part is seen through from a rear side of the decorated part. Moreover, the decorated part is seen through, sometimes being unfavorably overlapped with decoration drawn at the rear side of the decorated part. Therefore, in the present embodiment, in order to avoid such a situation, the light-blocking layer 2 is provided between the main body 3 and the decorating layer 1, as explained below.

As shown in FIG. 1, the light-blocking layer 2 is a layer having a function to reflect light 'L' at least at a surface of a side of the decorating layer 1, the light 'L' coming from an external side. Any material (ink) can be used as a material for the light-blocking layer 2, as far as the material implements this function and the material can be discharged for forming by means of an ink-jet method as described later. For example, white ink, silver ink, or metallic ink can be used. Incidentally, an only requirement for the light-blocking layer 2 is to form an approximate thickness of ink, which can materialize the function, on the surface of the main body 3; and the thickness may be, for example, in a range of about 10 to 100 micrometers.

Incidentally, in the present embodiment, the light-blocking layer 2 is so placed as to cover an entire surface of the main body 3 being spherical. Nevertheless, the present invention is not limited to this arrangement, and the light-blocking layer 2 may be a component to cover only a part of the surface of the main body 3, provided that the light-blocking layer 2 is preferably placed only on the part where the decorating layer 1 is placed; the part being with the decorating layer 1 and facing a side of the main body 3.

The decorating layer 1 is a layer constituting a surface of the shaped object 10, and it is configured as a coloring layer when the surface of the main body 3 needs to be colored (also including a case of drawing a picture or a letter), and moreover it is configured as a layer for other decoration such as vanishing luster, and the like, on the surface. The decorating layer 1 is also a layer made of a material (ink) that can be discharged for forming by means of an ink-jet method in the same manner as the main body 3 and the light-blocking layer 2.

In a conventional technology; in order for completing a shaped object 10 as shown in FIG. 1, used is a method in which, for a main body formed by some means, a coating is placed onto the surface of the main body by way of applying a coating material by using a spraying machine and the like. Unfortunately, in the case where the main body has a complicated cubic structure (such as a hollow structure), using the method described above does not make it possible to place a coating onto a surface (internal surface).

Therefore, the present embodiment features a fact that the main body 3, the light-blocking layer 2, and the decorating layer 1 are all formed by using an ink-jet method. Namely, in parallel with shaping the main body, the light-blocking layer 2 and the decorating layer 1 are formed so that the shaping operation and decorating operation are put into practice at the same time.

In other words, the manufacturing method of a shaped object according to the present embodiment is a manufacturing method of a shaped object, by using an ink-jet method including; a lower area forming process in which light-blocking layer ink (second ink) is discharged on decorating layer ink (first ink) already discharged; a middle area forming process in which, after the lower area forming process, the decorating layer ink (first ink), the light-blocking layer ink (second ink), and main-body ink (third ink) are discharged, wherein, regardless of order of discharging operations, in a horizontal direction, a layer of the light-blocking layer ink (second ink) is positioned around a layer of the main-body ink (third ink) and a layer of the decorating layer ink (first ink) is positioned around the layer of the light-blocking layer ink (second ink); and an upper area forming process in which, after the middle area forming process, the decorating layer ink (first ink) is discharged on the light-blocking layer ink (second ink) already discharged; wherein, a main body having a cubic structure is constructed with the third ink, a light-blocking layer for covering a surface of the main body is constructed with the light-blocking layer ink (second ink), and a decorating layer for covering a surface of the light-blocking layer is constructed with the decorating layer ink (first ink) for forming a shaped object.

Incidentally, in the present embodiment, explained is a mode in which depositing operation is repeated to form the shaped object 10 and decorate it by means of dropping ink and depositing it by making use of an ink-jet method. In other words, in the present embodiment, explained is a mode in which the shaped object 10 is formed and decorated from a lower position toward an upper position in a direction of gravitational force.

(The Lower Area Forming Process)

The lower area forming process described above is a process for forming a lower area of the shaped object 10 shown in FIG. 1.

Figure 2:
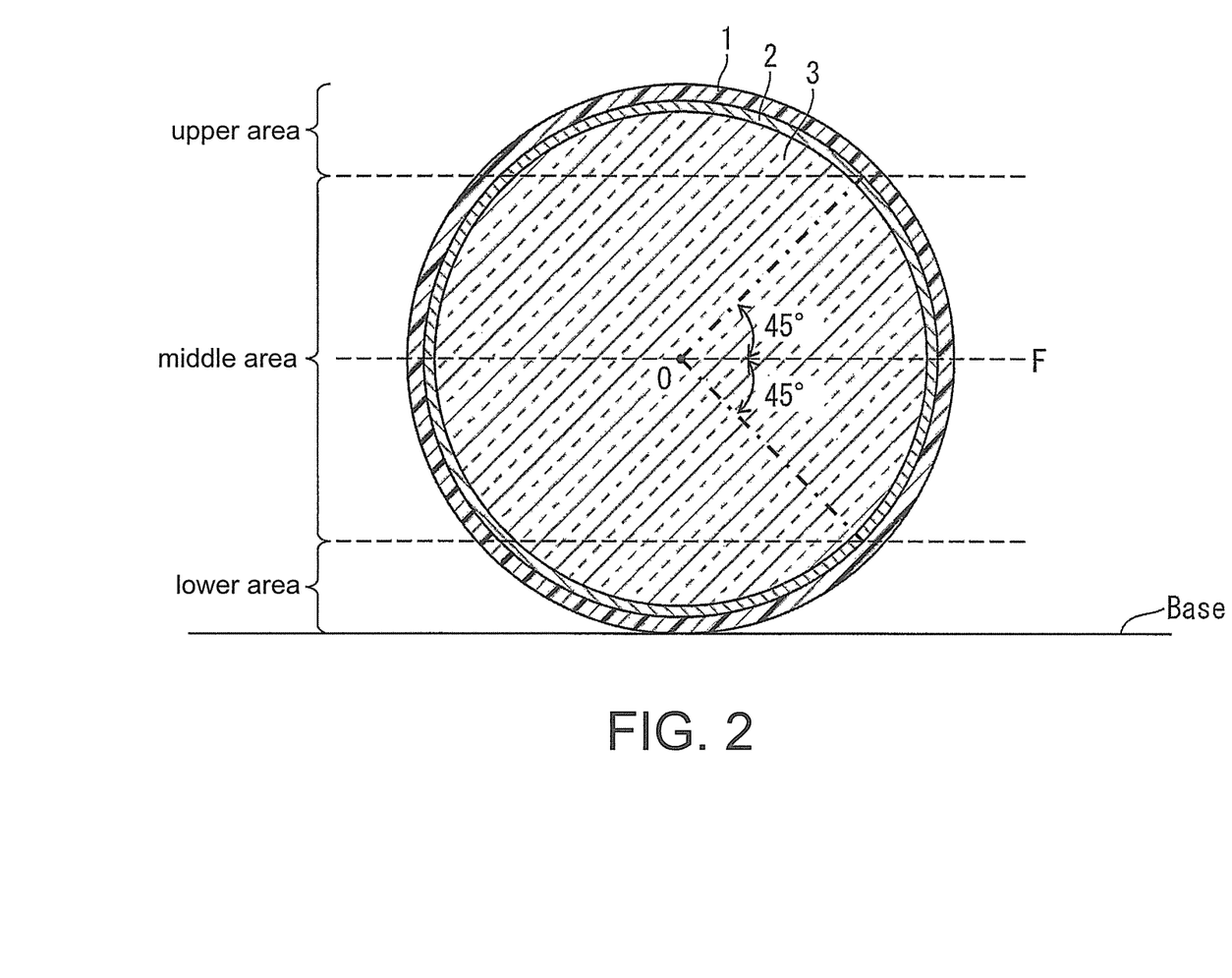
FIG. 2 is a cross section view of the shaped object shown in FIG. 1.

At this point of the explanation, FIG. 2 shows a cross section view of the shaped object 10 shown in FIG. 1. According to a manufacturing method of a shaped product in the present embodiment, the lower area shown in FIG. 2 is formed and decorated by means of the lower area forming process. Incidentally, in other words, "the lower area" represents an area to be formed in an initial process of the manufacturing method of a shaped product, and it does not mean a lower part of the shaped object 10 of itself.

Figure 3:
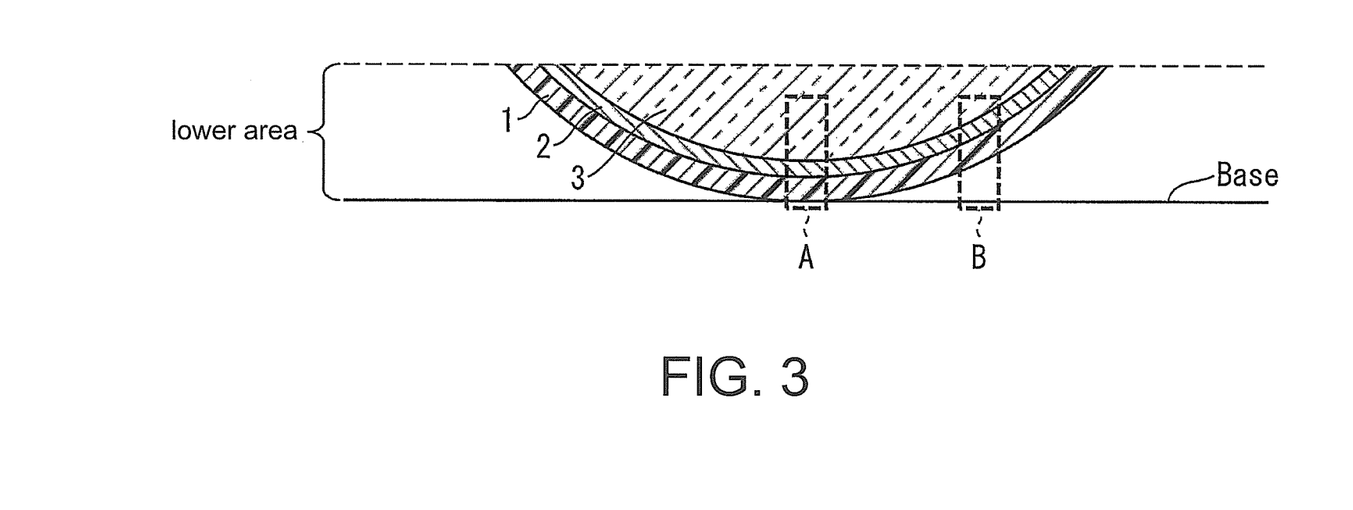
FIG. 3 is a partial cross section view showing a lower area that is a part of the shaped object shown in FIG. 2.

The lower area shown in FIG. 2, being centered around a center point 'O' of the shaped object 10 that is spherical, is an area included in an angular range beyond 45 degrees downward from a horizontal plane 'F' passing through the center point 'O'. FIG. 3 is an enlarged illustration that shows only the lower area represented in FIG. 2.

As shown in FIG. 3, in the lower area, a part of the decorating layer 1 is positioned at a lower part in a direction of gravitational force, a part of the light-blocking layer 2 is so positioned as to be laminated on the decorating layer 1, and furthermore a part of the main body 3 is so positioned as to be laminated on the light-blocking layer 2.

In the following paragraphs, at first the lower area forming process is explained with reference to an area 'A' of FIG. 3, which is a part of the lower area shown in FIG. 3.

Figure 4:
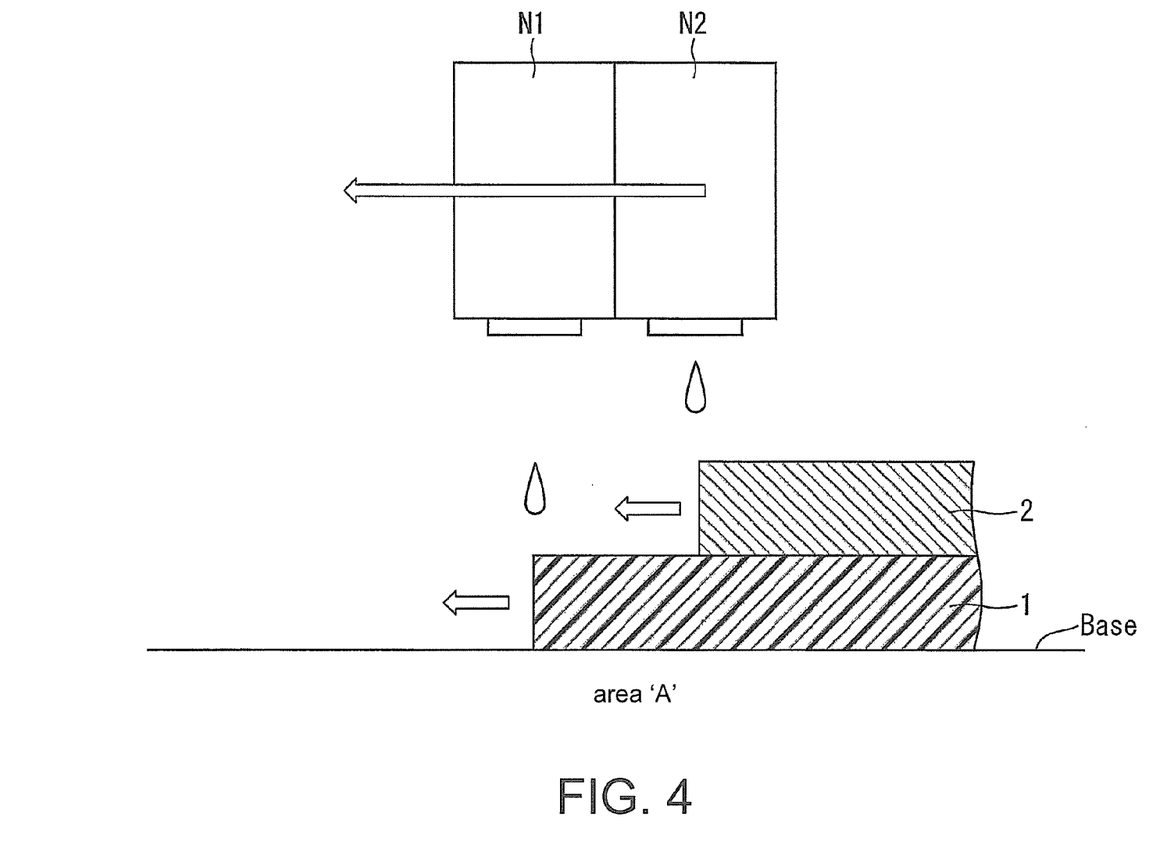
FIG. 4 is an explanatory diagram showing a process of forming and decorating with respect to an area 'A' represented in FIG. 3, by means of the manufacturing method of a shaped object, according to the embodiment of the present invention.

FIG. 4 is a diagram for explaining a process of forming and decorating operations with respect to the area 'A' of FIG. 3. In the lower area forming process, the decorating layer ink for forming the decorating layer 1 located at a lower position in the direction of gravitational force is dropped at first; and then onto a deposited puddle of decorating layer ink (hereinafter, described as the 'decorating layer 1'), the light-blocking layer ink for forming the light-blocking layer 2 is dropped in order to form a deposited puddle of light-blocking layer ink (hereinafter, described as the 'light-blocking layer 2'). In other words, for a certain ink-dropping area, the decorating layer ink is dropped earlier than the light-blocking layer ink.

By controlling ink-dropping timing in this way, a structure in which the light-blocking layer 2 is formed on the decorating layer 1, as the area 'A' shows in FIG. 3 can be materialized.

Control of the ink-dropping timing can be implemented by means of controlling ink-dropping timing for dropping ink from each of ink-jet nozzles N1 and N2, shown in FIG. 4, onto a certain area by a control unit that is not illustrated. Namely, in FIG. 4, an ink-jet head including a first ink-jet nozzle N1 for dropping the decorating layer ink to form the decorating layer 1, and a second ink-jet nozzle N2 for dropping the light-blocking layer ink to form the light-blocking layer 2, is used; and the first ink-jet nozzle N1 and the second ink-jet nozzle N2 are placed side by side, and the ink-jet head is moved along a placement direction of the nozzles N1 and N2 in such a way that, above a certain area, the first ink-jet nozzle N1 passes through earlier than the second ink-jet nozzle N2 does. According to this arrangement, to a certain area, the decorating layer ink is dropped at first to get deposited there, and then the light-blocking layer ink is dropped next on the above deposit to get deposited so that the shaped object can be formed. Incidentally, as the ink-jet nozzles, a conventionally-known device can be used, and therefore an explanation about the ink-jet nozzles is omitted here.

The volume of deposit of the decorating layer 1 and the light-blocking layer 2 to be deposited onto a certain area can easily be adjusted by way of adjusting the volume to be dropped out of each of the ink-jet nozzles N1 and N2. This adjustment can also be implemented by a control unit that is not illustrated.

In other words, if an ink-jet machine obtains a datum, for example such as a CAD datum, representing what cubic structure the shaped object 10 (refer to FIG. 1) is formed to have, the ink-jet machine is able to obtain information on what ink and how much ink needs to be deposited, and what ink needs to be deposited in what order, out of the data, with respect to a certain part of an area. Then, according to the information, the control unit can control the ink-jet nozzles N1 and N2.

Incidentally, FIG. 4 shows procedures up to forming the light-blocking layer 2 on the decorating layer 1. Nevertheless, the present invention is not limited to this arrangement, and it is also possible as shown in FIG. 5 to drop the main-body ink for forming the main body 3, subsequent to dropping and depositing the light-blocking layer ink for forming the light-blocking layer 2.

In conclusion, while ink forming each layer is dropped and laminated for shaping an object; in order of ink forming a layer positioned at an outermost surface of the shaped object 10 (refer to FIG. 1), ink forming a layer positioned one-layer inner side, and ink forming a layer positioned further inner side to the last layer; an essence of the lower area forming process in the present embodiment is a fact that, since the decorating layer 1 is constructed as an outermost layer of the shaped object 10, a decorating operation for the object can be carried out at the same time as shaping the object.

Figure 5:
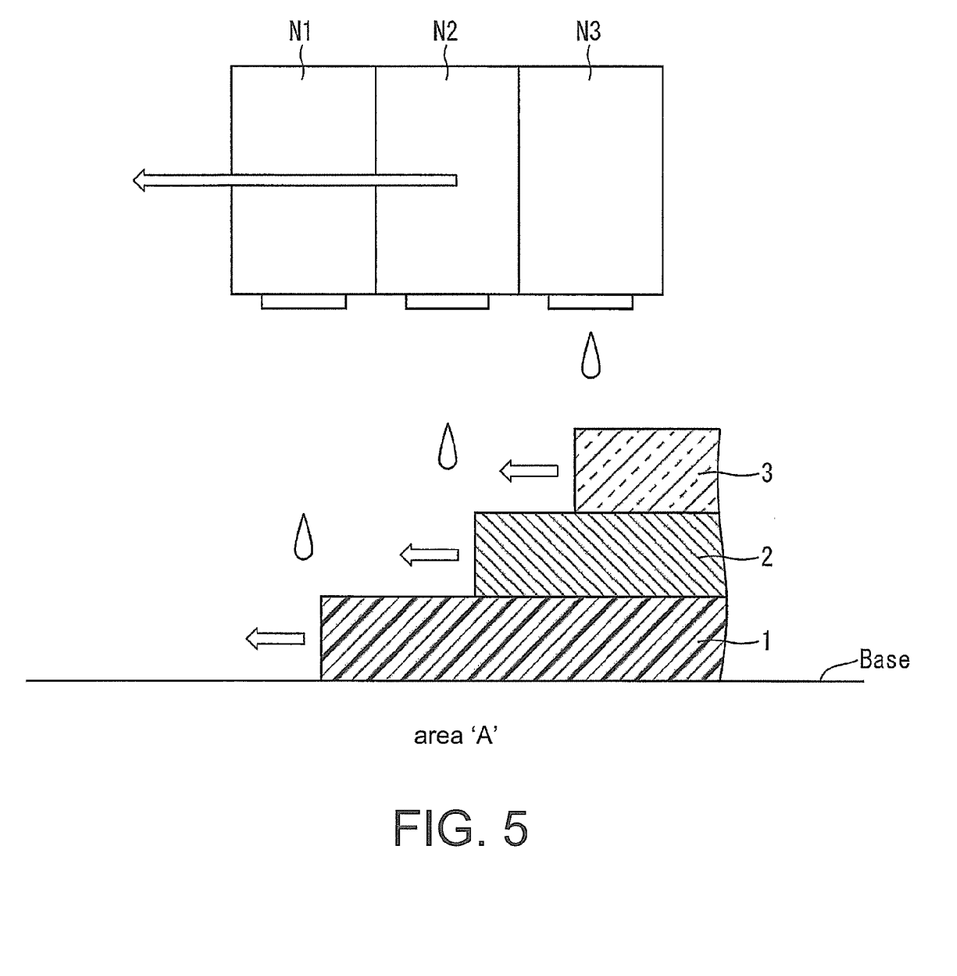
FIG. 5 is an explanatory diagram showing a variation of the process of forming and decorating with respect to an area 'A' represented in FIG. 3, by means of the manufacturing method of a shaped object, according to the embodiment of the present invention.

Particularly, in the present embodiment, the nozzles N1 and N2 (and N3) are combined together as shown in FIG. 4 and FIG. 5; and being arranged as shown in FIG. 4 and FIG. 5, the nozzles are collectively moved in a direction shown with an arrow in FIG. 4 and FIG. 5. Thus, by making a line of these nozzles pass through one time above a certain area, a laminated structure including the decorating layer 1 and the light-blocking layer 2 (and the main body 3) can be formed. Since this method can efficiently form a laminated structure, therefore this method is preferable in comparison with a case of using a machine in which each of movements of nozzles for laminating the decorating layer 1 and the light-blocking layer 2 (and the main body 3) needs to be controlled independently.

Incidentally, the area 'A' shows in FIG. 4 and FIG. 5 is an area located at a lowest position in the lower area. In the meantime, an explanation is made next with reference to FIG. 6 on how the lower area forming process is carried out at an area 'B' shown in FIG. 3.

Figure 6:
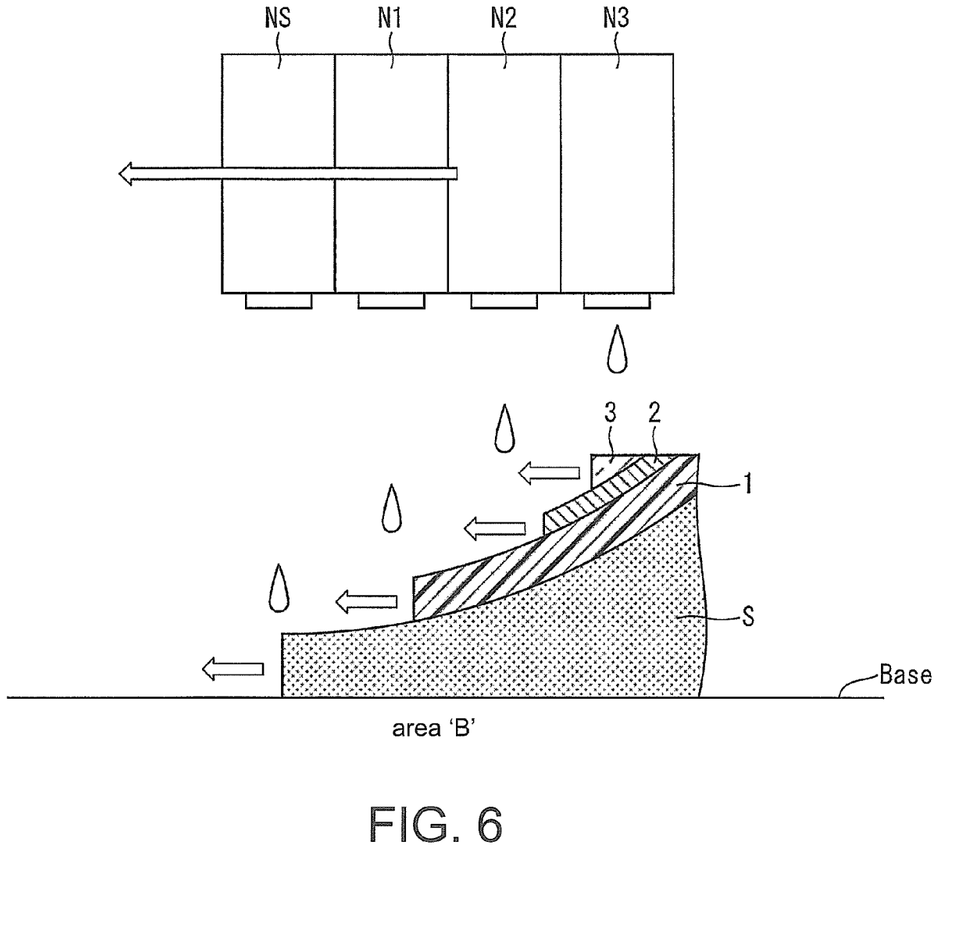
FIG. 6 is an explanatory diagram showing a process of forming and decorating with respect to an area 'B' represented in FIG. 3, by means of the manufacturing method of a shaped object, according to the embodiment of the present invention.

FIG. 6 is a diagram for explaining a process of forming and decorating with respect to an area 'B' shown in FIG. 3. The area 'B' is located at a position shifted horizontally from the area 'A'. The area 'A' is an area located at a lowest position in the lower area, and an outer surface of the shaped object 10 (a surface of the decorating layer 1) comes in contact with a base surface 'Base', as shown in FIG. 4. On the other hand, in the area 'B', the outer surface of the shaped object 10 (a surface of the decorating layer 1) is distant from the base surface 'Base.'

For forming the area 'B' in the lower area forming process, a supporting component as a support for the shaped object 10 is formed at a position where the shaped object 10 is distant. For the supporting component, before dropping the decorating layer ink in order to form the decorating layer 1, supporting-component ink in order to form the supporting component is dropped and deposited in a similar manner by using an ink-jet method. Then, the decorating layer ink is dropped and deposited onto a deposited puddle of the supporting-component ink (hereinafter, described as the 'supporting component'). Then the light-blocking layer ink and the main-body ink are also dropped and deposited by means of the method explained with respect to the area 'A'. Namely, with respect to the area 'B', the supporting-component ink is dropped in advance of the decorating layer ink, and the light-blocking layer ink is dropped after the decorating layer ink is dropped. Then, the main-body ink is dropped after the light-blocking layer ink is dropped. Thus, a structure shown at the area 'B' can be materialized.

To materialize the structure, it is only necessary to control timing of dropping each ink as described earlier. In order to control the timing of dropping ink, only a requirement is that a control unit not illustrated controls timing of dropping ink when the ink is dropped onto a certain area from each of an ink-jet nozzle NS and the ink-jet nozzles N1, N2 and N3 shown in FIG. 6. Namely, in FIG. 6, used is an ink-jet head including; the ink-jet nozzle NS for the supporting component to drop the supporting-component ink, a first ink-jet nozzle N1 to drop the decorating layer ink, a second ink-jet nozzle N2 to drop the light-blocking layer ink, and, a third ink-jet nozzle N3 to drop the main-body ink. Then, the ink-jet nozzle NS for the supporting component, the first ink-jet nozzle N1, the second ink-jet nozzle N2, and the third ink-jet nozzle N3 are arranged on a line; and these nozzles are moved along a placement direction of the nozzles NS, N1, N2 and N3 in such a way that the ink-jet nozzle NS for the supporting component, the first ink-jet nozzle N1, the second ink-jet nozzle N2, and the third ink-jet nozzle N3 pass through in this order, above a certain area. According to this arrangement, to a certain area, the supporting-component ink is dropped at first to get deposited there, and then the decorating layer ink is dropped next on the above deposit to get deposited there, and moreover the light-blocking layer ink is dropped on the above deposit to get deposited there, and still further the main-body ink is dropped on the above deposit to get deposited there so that the shaped object can be formed.

Incidentally, in the area 'B', a border of the layer is so formed as to be curved (to be a curved surface) along the outer surface of the shaped object 10. This area can also be formed by way of adjusting the volume of dropping ink so as to gradually reduce the volume of the supporting-component ink to be dropped, in the same way as adjusting the volume of deposit described above.

Furthermore, according to the present embodiment, a section from a left end on the page to a right end on the same of the lower area shown in FIG. 3 is formed by way of moving the ink-jet head (refer to FIG. 4 through FIG. 6) from a left side on the page to a right side on the same of the FIG. 3. At the time, it is not required to form a section of the lower area from its bottom end to its position adjacent to the middle area by a one-time movement. Nevertheless, in the case where the area is formed by multiple movements, the timing of dropping ink described above is adjusted for at least one of the movements, so as to form the layers (including the supporting component and the main body) that are different from one another.

Incidentally, though the numbers of nozzles are different in FIG. 4, FIG. 5, and FIG. 6, they are just for convenience of explanation. In the present embodiment, the ink-jet head is provided with four kinds of nozzles in order to form a supporting component 'S', the decorating layer 1, the light-blocking layer 2, and the main body 3; and only a requirement is that control is carried out so as not to drop the supporting-component ink from the ink-jet nozzle NS for the supporting component, for example, at the area 'A'.

In the present embodiment, an expression of "controlling the timing of dropping ink" is used for representing "controlling which ink-jet nozzle drops ink at first with respect to a certain target area for dropping ink." Therefore, for example, FIG. 6 simply shows a position of the ink-jet head at a certain moment, and it does not mean that the timing of each dropping ink from the four ink-jet nozzles is different from one another at the time. Namely, the four ink-jet nozzles may simultaneously drop (discharge) ink at that moment.

After forming the lower area finishes, subsequently the middle area shown in FIG. 2 is formed.

(The Middle Area Forming Process)

Figure 7:
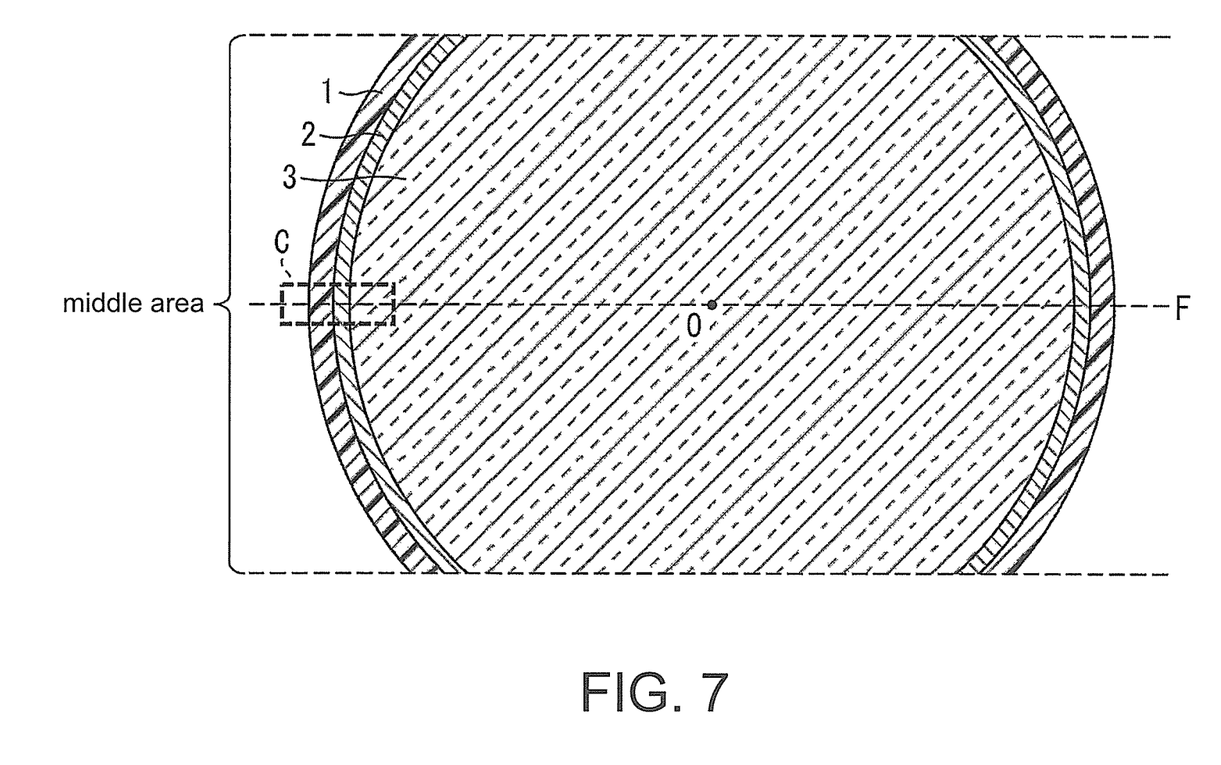
FIG. 7 is a partial cross section view showing a middle area that is a part of the shaped object shown in FIG. 2.

The middle area shown in FIG. 2, being centered around a center point 'O' of the shaped object 10 that is spherical, is an area included in an angular range within 45 degrees upward and 45 degrees downward with respect to the horizontal plane 'F' passing through the center point 'O'. FIG. 7 is an enlarged illustration that shows only the middle area represented in FIG. 2.

As shown in FIG. 7, the middle area generally has such a structure, in which; having the main body 3 as its middle, a part of the light-blocking layer 2 is positioned at an outside of the middle (namely, in a leftward direction and a rightward direction on the page; or in other words, in an outward direction from the center point 'O' of the shaped object 10); and then, a part of the decorating layer 1 is positioned at a further outside of the light-blocking layer 2.

In the following paragraphs, the middle area forming process is explained with reference to an area 'C' of FIG. 7, which is a part of the middle area shown in FIG. 7.

Figure 8:
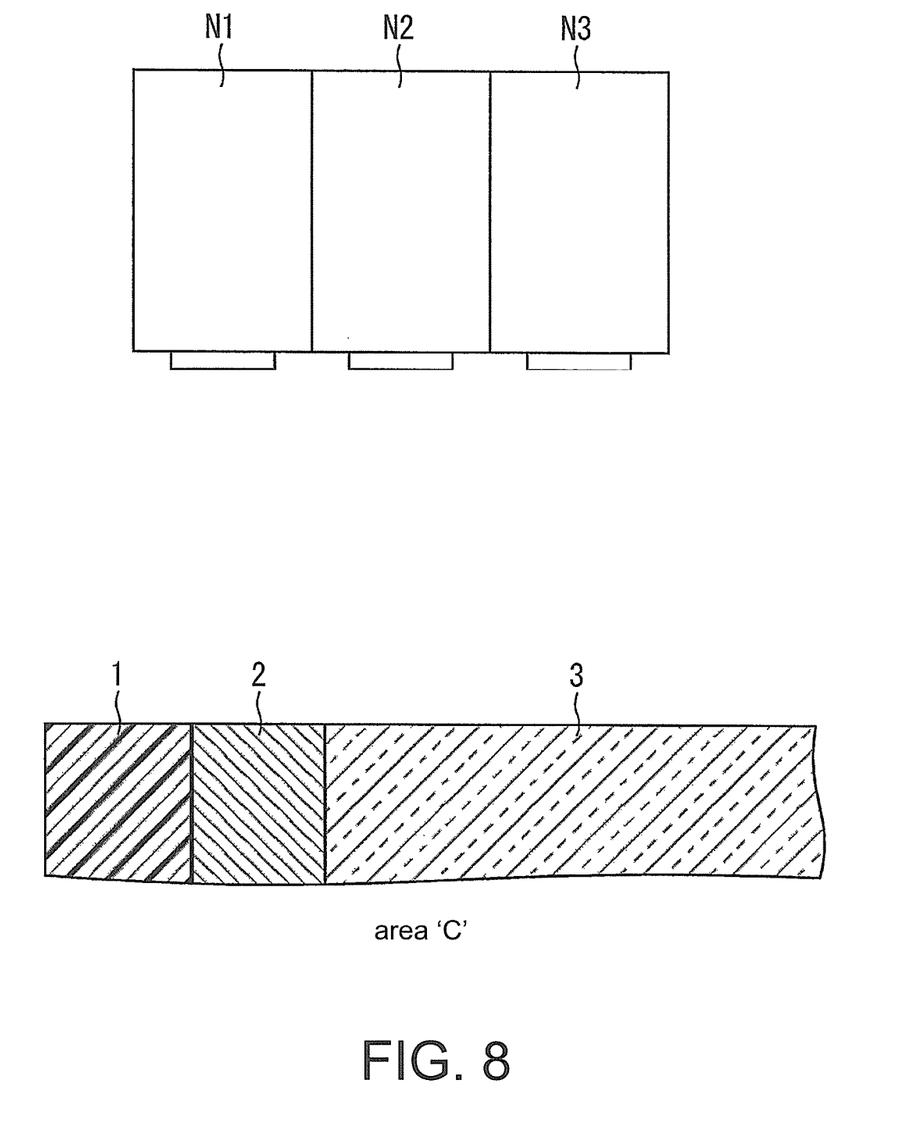
FIG. 8 is an explanatory diagram showing a process of forming and decorating with respect to an area 'C' represented in FIG. 7, by means of the manufacturing method of a shaped object, according to the embodiment of the present invention.

FIG. 8 is a diagram for explaining a process of forming and decorating with respect to an area 'C' represented in FIG. 7. Incidentally, for convenience of explanation, an explanation on the supporting component is omitted.

In the middle area forming process; after the lower area forming process described above, the decorating layer ink, the light-blocking layer ink, and the main-body ink are dropped (discharged) in such a way that; in a horizontal direction, being adjacent to (outside of) the main body 3 formed of the main-body ink (the third ink), the light-blocking layer 2 formed of the light-blocking layer ink is placed; and furthermore, being adjacent to (outside of) the light-blocking layer 2, the decorating layer 1 formed of the decorating layer ink is placed. In this process, it does not matter what layer is formed at first and what layer is formed next. In other words, the middle area is not an area having a structure in which different kinds of layers are vertically laminated, and therefore order of forming the layers does not matter.

Incidentally, in order to form all of the main body 3, the light-blocking layer 2, and the decorating layer 1 only by one-time movement of the ink-jet head, sometimes operation timing for discharging ink from each of the nozzles N1, N2, and N3 (and the nozzle NS shown in FIG. 6 as well) is determined by itself, depending on an arrangement of the ink-jet nozzles, so that order of forming each layer is also determined by itself.

In the meantime, it does not matter how the order of forming the main body 3, the light-blocking layer 2, and the decorating layer 1 (and the supporting component as well) is. On the other hand, in a section of the middle area close to the lower area as well as a section of the same close to the upper are, a layer is duplicate in the upper and lower areas, or the layer seems to be almost duplicate there. Therefore, an area to be formed by way of the middle area forming process is an area in which, at widest, a normal line angle at an outer surface of the decorating layer 1 of the shaped object 10 (i.e., an outermost surface of the shaped object 10) is included in an angular range of ±45 degrees, in relation to a horizontal line or a reference line along which the ink-jet nozzle discharging the decorating layer moves, as shown in FIG. 2. In other words, the area to be formed by way of the middle area forming process is an area that is, being centered around the center point 'O' of the shaped object 10 being spherical, included in an angular range within 45 degrees upward and 45 degrees downward, at widest, with respect to the horizontal plane 'F' passing through the center point 'O'; and preferably it is an area that is, being centered around the center point 'O' of the shaped object 10 being spherical, included in an angular range within 30 degrees upward and 30 degrees downward, with respect to the horizontal plane 'F' passing through the center point 'O'. Moreover, it is further preferred that the middle area forming process forms an area that is, being centered around the center point 'O' of the shaped object 10 being spherical, included in an angular range within 15 degrees upward as well as downward, with respect to the horizontal plane 'F' passing through the center point 'O'. If the middle area forming process forms a range, being centered around the center point 'O' and beyond an angular range of 45 degrees upward as well as downward, with respect to the horizontal plane 'F' passing through the center point 'O', there may appear a risk that a laminated structure cannot be formed successfully. Therefore, an area, being centered around the center point 'O', beyond 45 degrees upward as well as downward, with respect to the horizontal plane 'F' passing through the center point 'O', is formed by way of either the lower area forming process described above or the upper area forming process described later.

After forming the middle area finishes, subsequently the upper area shown in FIG. 2 is formed.

(The Upper Area Forming Process)

Figure 9:
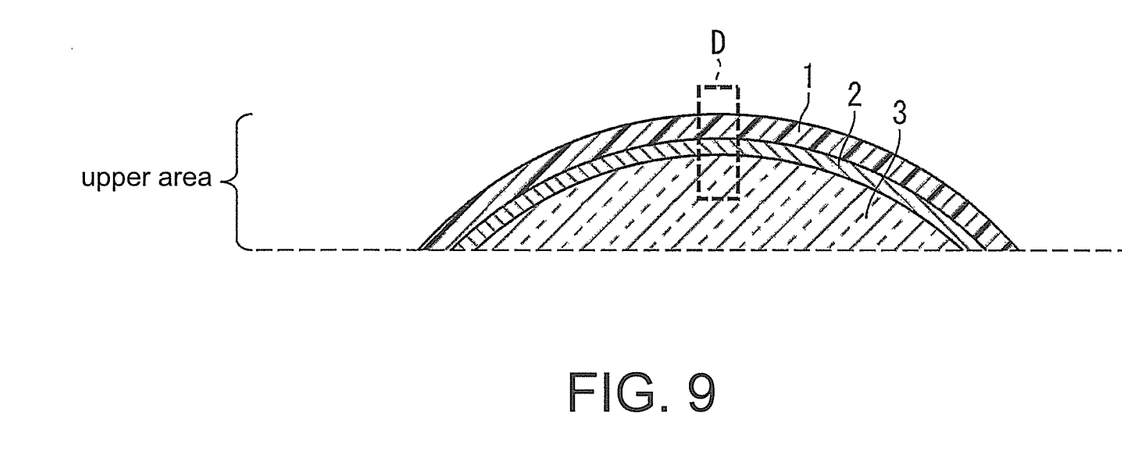
FIG. 9 is a partial cross section view showing an upper area that is a part of the shaped object shown in FIG. 2.

The upper area shown in FIG. 2, being centered around a center point 'O' of the shaped object 10 that is spherical, is an area included in an angular range beyond 45 degrees upward from a horizontal plane 'F' passing through the center point 'O'. FIG. 9 is an enlarged illustration that shows only the upper area represented in FIG. 2. Incidentally, in other words, the upper area represents an area to be formed by a final process of the manufacturing method of a shaped product, and it does not mean an upper part of the shaped object 10 of itself.

As shown in FIG. 9, in the upper area, a part of the main body 3 is positioned at a lower part in a direction of gravitational force, a part of the light-blocking layer 2 is so positioned as to be laminated on the main body 3, and furthermore a part of decorating layer 1 is so positioned as to be laminated on the light-blocking layer 2.

In the following paragraphs, the upper area forming process is explained with reference to an area 'D' of FIG. 9, which is a part of the upper area shown in FIG. 9.

Figure 10:
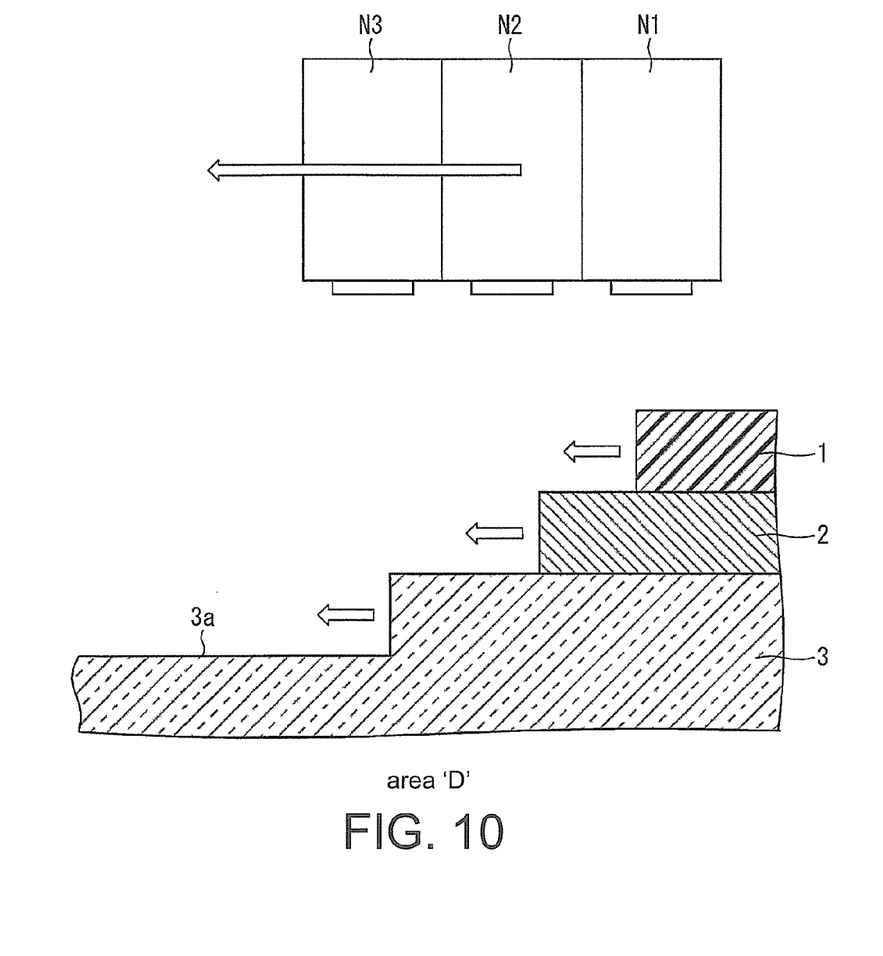
FIG. 10 is an explanatory diagram showing a process of forming and decorating with respect to an area 'D' represented in FIG. 9, by means of the manufacturing method of a shaped object, according to the embodiment of the present invention.

FIG. 10 is a diagram for explaining a process of forming and decorating operations with respect to the area 'D' of FIG. 9. In the upper area forming process, at first, the main-body ink for further depositing a main body 3 is dropped on a surface 3a of the main body 3 already formed at a lower part in a direction of gravitational force; and then onto a deposited puddle of main-body ink (hereinafter, described as the 'main body 3'), the light-blocking layer ink for forming the light-blocking layer 2 is dropped in order to form a deposited puddle of light-blocking layer ink (hereinafter, described as the 'light-blocking layer 2'); and then onto the light-blocking layer 2, the decorating layer ink for forming the decorating layer 1 is dropped in order to form a deposited puddle of decorating layer ink (hereinafter, described as the 'decorating layer 1').

In the present embodiment, the nozzles N1 and N2 (and N3) are combined together as shown in FIG. 10; and being arranged as shown in FIG. 10, the nozzles are collectively moved in a direction shown with an arrow in FIG. 10. Thus, by making a line of these nozzles pass through one time above a certain area, while the timing of dropping ink being controlled, a structure can be materialized in such a way that the light-blocking layer 2 is formed on the main body 3 shown in the area 'D' of FIG. 10; and moreover the decorating layer 1 is formed on the light-blocking layer 2. For controlling the timing of dropping ink, the control unit explained in relation to the lower area forming process can be used, and the volume of deposit can also be controlled. Incidentally, the supporting-component ink may be dropped also for the area 'D'.

Incidentally, though all the three layers including the main body 3, the light-blocking layer 2, and the decorating layer 1 are formed by one-time movement of the ink-jet head in the explanation on the upper area forming process described above, the present invention is not limited to this arrangement, and only a requirement is that at least two layers are formed by one-time movement of the ink-jet head.

Moreover, though not only the light-blocking layer 2 and the decorating layer 1 but also the main body 3 are formed in the explanation on the upper area forming process described above, the present invention is not limited to this arrangement, and only the light-blocking layer 2 and the decorating layer 1 may as well be laminated.

Incidentally, ink discharged from each nozzle is cured by irradiation with ultraviolet launched from an ultraviolet irradiation unit that is not shown. Namely, it can be said that each ink is ultraviolet curable ink. The ultraviolet irradiation unit is positioned, for example, at a rear side in a moving direction of the ink-jet head; and then, a mode can be applied in such a way as to irradiate ultraviolet after each ink is discharged from the ink-jet head.

Modification Example 1

Figure 11:
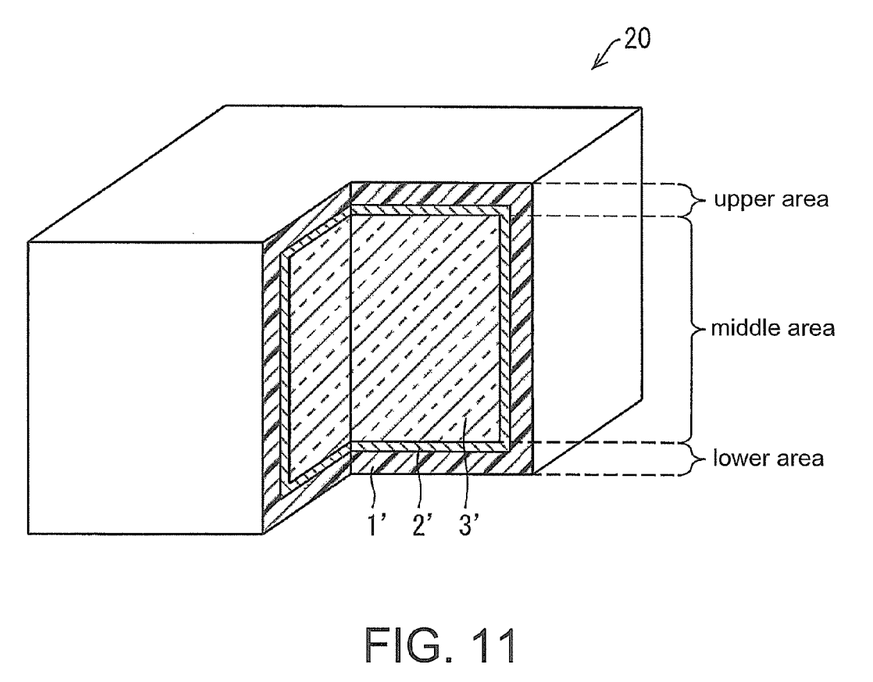
FIG. 11 is a partial cross section view showing another form of a shaped object formed by the manufacturing method of a shaped object according to the embodiment of the present invention.

Though the shaped object 10 is spherical in the embodiment described above, as shown in FIG. 1, the present invention is not limited to this arrangement. FIG. 11 is a partial cross section view showing a shaped object 20 being a parallelepiped, as a modification example of a shaped object. In a similar way as FIG. 1 shows, the shaped object 20 of a parallelepiped, shown in FIG. 11, also includes; a main body 3', a light-blocking layer 2', and a decorating layer 1' in such a way that the light-blocking layer 2' covers a surface of the main body 3' of the parallelepiped, and furthermore the decorating layer 1' covers a surface of the light-blocking layer 2'.

Even in the case of the shaped object 20 of such a parallelepiped, surface decoration together with forming operation can be implemented while a lower area, a middle area, and an upper area are differentiated as described in the above embodiment, and each area is formed by using each process described above.

Modification Example 2

Though the ink-jet head is moved in the embodiment described above, a target component to be coated may be moved; and furthermore, even both the elements may be moved, as far as relative positional relationships between the target component to be coated and the ink-jet head change.

Modification Example 3

Though the shaped object 10 with three-layer structure including the main body 3, the light-blocking layer 2, and the decorating layer 1 is explained in the embodiment described above, the present invention is not limited to this arrangement, and a shaped object of a structure having four or more layers can be formed by way of increasing the number of the types of ink.

(Appendant Descriptions)

In order to solve the issue described above, the manufacturing method of a shaped object according to the present invention includes: the lower area forming process in which the decorating layer ink and the light-blocking layer ink are discharged for forming the lower area where the light-blocking layer is laminated on the decorating layer; the middle area forming process in which, after the lower area forming process described above, the decorating layer ink, the light-blocking layer ink, and main-body ink are discharged, regardless of order of discharging operations, for forming the middle area, where the light-blocking layer is positioned around the main body and the decorating layer is positioned around the light-blocking layer in relation to a horizontal direction; and the upper area forming process in which, after the middle area forming process described above, the light-blocking layer ink and the decorating layer ink are discharged for forming the upper area where the decorating layer is laminated on the light-blocking layer; and for the purpose of forming a shaped object, the main body having a cubic structure is constructed with the main-body ink, the light-blocking layer covering a surface of the main body is constructed with the light-blocking layer ink, and moreover the decorating layer covering a surface of the light-blocking layer is constructed with the decorating layer ink.

According to the configuration described above, it is possible to provide a manufacturing method of a shaped object, in which a surface of the shaped object can be decorated, while the shaped object being in a forming process.

Furthermore, according to the configuration described above, shaping operation and decorating operation are put into practice in parallel; and therefore even in the case where a shaped object has a complicated cubic structure, surface decoration can ideally be materialized on a surface of a main body.

In a mode of the manufacturing method of a shaped object according to the present invention; in addition to the above configuration, the decorating layer ink and the light-blocking layer ink are discharged by means of an ink-jet method; and in the lower area forming process, the first ink-jet nozzle N1 for discharging the decorating layer ink and the second ink-jet nozzle N2 for discharging the light-blocking layer ink are collectively moved in such a way that the second ink-jet nozzle N2 passes through above a certain area, subsequent to the first ink-jet nozzle N1, and each of the first and second ink-jet nozzles discharges ink onto the certain area; and meanwhile in the upper area forming process, the first ink-jet nozzle N1 passes through above another certain area, subsequent to the second ink-jet nozzle N2, and each of the first and second ink-jet nozzles discharges ink onto the relevant certain area.

According to the configuration described above, a laminated structure can be formed by each nozzle discharging ink.

Moreover, in a mode of the manufacturing method of a shaped object according to the present invention; in addition to the configuration described above, the main-body ink is further discharged on the layer of the light-blocking layer ink, after discharging the light-blocking layer ink, in the lower area forming process.

According to the configuration described above, the decorating layer, the light-blocking layer, and the main body can be formed at once in the lower area forming process.

Moreover, in a mode of the manufacturing method of a shaped object according to the present invention; in addition to the configuration described above, a layer of the main-body ink is formed by way of discharging the main-body ink, and the second ink is discharged on the main-body ink, in the upper area forming process.

According to the configuration described above, the decorating layer, the light-blocking layer, and the main body can be formed at once in the upper area forming process.

In a mode of the manufacturing method of a shaped object according to the present invention; in addition to the above configuration, the middle area forming process forms an area of the shaped object, in which a normal line angle at an outer surface of the layer of the first ink in the shaped object is included in an angular range of ±45 degrees, in relation to a horizontal line or a reference line along which the first ink-jet nozzle discharging the first ink moves.

In a mode of the manufacturing method of a shaped object according to the present invention; in addition to the above configuration, the shaped object is spherical, and the middle area forming process forms an area of the shaped object, which is, being centered around a center point of the spherical object, included in an angular range within 45 degrees upward and downward, with respect to the horizontal plane 'F' passing through the center point.

In a mode of the manufacturing method of a shaped object according to the present invention; in addition to the above configuration, colored ink or decoration ink is used as the decorating layer ink.

In a mode of the manufacturing method of a shaped object according to the present invention; in addition to the above configuration, white ink, silver ink, or metallic ink is used as the light-blocking layer ink.

In a mode of the manufacturing method of a shaped object according to the present invention; in addition to the above configuration, the supporting-component ink for forming a supporting component as a support for the shaped object is discharged in at least one process out of the lower area forming process, the middle area forming process, and the upper area forming process.

The present invention is not limited to the embodiment and the modifications described above, and various alterations can be made within scopes described in the claims, and an embodiment to be obtained as a result of arbitrarily combining technical means disclosed individually in the embodiment and modification examples is also included in a technical scope of the present invention. Moreover, a new technical feature can be formed by way of combining the technical means disclosed individually in the embodiment and modification examples.

INDUSTRIAL APPLICABILITY

The present invention can be utilized for a cubic shaped device, and the present invention makes it possible to carry out shaping operation and decorating operation in parallel, and to form a shaped object efficiently.

REFERENCE NUMERALS

1. & 1'. decorating layer
2. & 2'. light-blocking layer
3. & 3'. main body
3a. surface
10. & 20. shaped object
N1. first ink-jet nozzle
N2. second ink-jet nozzle
N3. third ink-jet nozzle
NS. ink-jet nozzle for supporting component
'O' center point
'S' supporting component

What is claimed is:
1. A manufacturing method of a shaped object, comprising:
a lower area forming process in which a first ink and a second ink are discharged for forming a lower area where a layer of the second ink is laminated on a layer of the first ink;
a middle area forming process in which, after the lower area forming process, the first ink, the second ink, and a third ink are discharged, regardless of order of discharging operations, for forming a middle area, where a layer of the second ink is positioned around a layer of the third ink and a layer of the first ink is positioned around the layer of the second ink in relation to a horizontal direction; and
an upper area forming process in which, after the middle area forming process, the second ink and the first ink are discharged for forming an upper area where a layer of the first ink is laminated on a layer of the second ink;
wherein, for forming the shaped object, a main body having a cubic structure is constructed with the third ink, a light-blocking layer covering a surface of the main body is constructed with the second ink, and a decorating layer covering a surface of the light-blocking layer is constructed with the first ink.

2. The manufacturing method of a shaped object according to claim 1:

wherein the first ink and the second ink are discharged by means of an ink-jet method; and in the lower area forming process, a first ink-jet nozzle for discharging the first ink and a second ink-jet nozzle for discharging the second ink are collectively moved in such a way that the second ink-jet nozzle passes through above a certain area, subsequent to the first ink-jet nozzle, and each of the first and second ink-jet nozzles discharges ink onto the certain area; and meanwhile in the upper area forming process, the first ink-jet nozzle passes through above another certain area, subsequent to the second ink-jet nozzle, and each of the first and second ink-jet nozzles discharges ink onto the another certain area.

3. The manufacturing method of a shaped object according to claim 1:

wherein the third ink is discharged in the lower area forming process in such a way that a layer of the third ink is laminated on the layer of the second ink.

4. The manufacturing method of a shaped object according to claim 2:

wherein the third ink is discharged in the lower area forming process in such a way that a layer of the third ink is laminated on the layer of the second ink.

5. The manufacturing method of a shaped object according to claim 1:

wherein the third ink is discharged in the upper area forming process so that the layer of the second ink is laminated on a layer of the third ink.

6. The manufacturing method of a shaped object according to claim 2:

wherein the third ink is discharged in the upper area forming process so that the layer of the second ink is laminated on a layer of the third ink.

7. The manufacturing method of a shaped object according to claim 1:

wherein the middle area forming process forms an area of the shaped object, in which a normal line angle at an outer surface of the layer of the first ink in the shaped object is included in an angular range of ±45 degrees, in relation to a horizontal line or a reference line along which the first ink-jet nozzle discharging the first ink moves.

8. The manufacturing method of a shaped object according to claim 2:

wherein the middle area forming process forms an area of the shaped object, in which a normal line angle at an outer surface of the layer of the first ink in the shaped object is included in an angular range of ±45 degrees, in relation to a horizontal line or a reference line along which the first ink-jet nozzle discharging the first ink moves.

9. The manufacturing method of a shaped object according to claim 1:

wherein the shaped object is a spherical object, and the middle area forming process forms an area of the shaped object, which is, being centered around a center point of the spherical object, included in an angular range within 45 degrees upward and downward, with respect to the horizontal plane passing through the center point.

10. The manufacturing method of a shaped object according to claim 2:

wherein the shaped object is a spherical object, and the middle area forming process forms an area of the shaped object, which is, being centered around a center point of the spherical object, included in an angular range within 45 degrees upward and downward, with respect to the horizontal plane passing through the center point.

11. The manufacturing method of a shaped object according to claim 1:

wherein a colored ink or a decoration ink is used as the first ink.

12. The manufacturing method of a shaped object according to claim 1:

wherein a white ink, a silver ink, or a metallic ink is used as the second ink.

13. The manufacturing method of a shaped object according to claim 1:

wherein a supporting-component ink for forming a supporting component as a support for the shaped object is discharged in at least one process out of the lower area forming process, the middle area forming process, and the upper area forming process.

14. The manufacturing method of a shaped object according to claim 2:

wherein a supporting-component ink for forming a supporting component as a support for the shaped object is discharged in at least one process out of the lower area forming process, the middle area forming process, and the upper area forming process.

* * * * *